US012704891B2

(12) United States Patent
Pamulaparthy et al.

(10) Patent No.: US 12,704,891 B2
(45) Date of Patent: Aug. 11, 2026

(54) ENHANCED POWER SUBSTATION DIGITAL TWINS

(71) Applicant: GE Infrastructure Technology LLC, Greenville, SC (US)

(72) Inventors: Balakrishna Pamulaparthy, Greenville, SC (US); Mitalkumar Kanabar, Greenville, SC (US); Ilia Voloh, Greenville, SC (US); David Macdonald, Greenville, SC (US)

(73) Assignee: GE VERNOVA INFRASTRUCTURE TECHNOLOGY LLC, Greenville, SC (US)

(*) Notice: Subject to any disclaimer, the term of this patent is extended or adjusted under 35 U.S.C. 154(b) by 327 days.

(21) Appl. No.: 18/592,677

(22) Filed: Mar. 1, 2024

(65) Prior Publication Data

US 2025/0278126 A1 Sep. 4, 2025

(51) Int. Cl.
*G06F 1/26* (2006.01)

(52) U.S. Cl.
CPC .................................... *G06F 1/26* (2013.01)

(58) Field of Classification Search
CPC . G06F 1/26; G06F 30/20; G06F 30/27; G05B 17/02
See application file for complete search history.

(56) References Cited

U.S. PATENT DOCUMENTS 11,381,582 B1 7/2022 Mohammed et al.
2019/0103762 A1* 4/2019 Dolezilek ............... H02J 13/13
2022/0051171 A1 2/2022 Cella et al.
2022/0206482 A1* 6/2022 Abeywickrama .. G05B 23/0221
(Continued)

FOREIGN PATENT DOCUMENTS

CN 114491931 A 5/2022
WO 2023/145996 A1 8/2023

OTHER PUBLICATIONS

Nashirul Haq, I., Kertha Utama, P., Pradipta, J., Putra, A. and Leksono, E., 2023. Development & Implementation of Microgrid Digital Twin Framework Based on Smart Grid Architectural Model. (Year: 2023).*

(Continued)

*Primary Examiner* — Alicia M. Choi

(74) *Attorney, Agent, or Firm* — Eversheds Sutherland (US) LLP

(57) ABSTRACT

Systems and methods for virtualizing power substations may include generating, for a first physical device of a power substation, a first virtual machine that models characteristics of the first physical device; generating, based on forecasted weather and operational parameters of the power substation, settings for the first virtual machine; generating, based on physical sensor data for the power substation, virtual sensors; generating, based on virtual sensor data from the virtual sensors and the settings, an asset digital twin model of the first physical device; generating, based on the virtual sensor data and the asset digital twin model, a cyber digital twin for the first physical device; generating, based on the virtual sensor data and the asset digital twin model, a physics-based digital twin for the first physical device; and generating a substation digital twin virtually representing the power substation, including the cyber digital twin and the physics-based digital twin.

20 Claims, 5 Drawing Sheets

(56) References Cited

U.S. PATENT DOCUMENTS

| | | | | |
|---|---|---|---|---|
| 2022/0207206 | A1* | 6/2022 | Zhang | G06F 30/23 |
| 2023/0127651 | A1* | 4/2023 | Cella | G06N 3/045 |
| | | | | 705/7.11 |
| 2024/0411958 | A1* | 12/2024 | Roemerman | G06N 20/20 |

OTHER PUBLICATIONS

International Search Report and Written Opinion. PCT/US2025/017790, dated May 12, 2025 (11 pp.).

* cited by examiner

500

Virtualized System Devices 509

Processor 3 506

...

Processor 2 504

Processor 1 502

512

Memory Controller 518

I/O Interface 520

Bus Controller 522

System Interface 524

Main Memory 516

I/O Bridge 525

I/O Bus

526

I/O Controller 528

I/O Device 530

ENHANCED POWER SUBSTATION DIGITAL TWINS

This disclosure generally relates to virtualization of electrical substations.

BACKGROUND

Some power substations use separate hardware for different applications. Virtualization of power substations for both information technology and operational technology may be beneficial.

SUMMARY

A method for virtualizing power substation physical components including electrical assets and Intelligent Electronic Devices (IEDs) into a substation digital twin architecture, may include: generating, for a first IED of a power substation, in a first virtual machine, a first IED digital twin that models historical and operational characteristics of the first IED; generating, based on forecasted weather and operational parameters of the power substation, adaptive or predictive settings for the first IED using the first IED digital twin; generating, based on physical sensor data measured or monitored by the first IED for the power substation, virtual sensors; generating, based on the virtual sensors, first virtual sensor data corresponding to first electrical assets represented by the first IED; generating, in a second virtual machine, based on the first virtual sensor data, an asset digital twin model of the first electrical assets; generating, based on the first virtual sensor data and the asset digital twin model, a cyber digital twin for the first electrical assets; generating, based on the virtual sensor data and the asset digital twin model, a physics-based digital twin for the first electrical assets; generating a substation digital twin virtually representing the power substation, wherein the substation digital twin comprises a logical combination of cyber digital twins, comprising the cyber digital twin, and physics-based digital twins, comprising the physics-based digital twin, of electrical assets of IEDs, comprising the first IED, in the power substation; generating a substation digital twin architecture using a logical combination of substation digital twins comprising the substation digital twin; and managing a real-time power substation operation using the substation digital twin architecture and adaptive and predictive settings for the IEDs.

A non-transitory computer-readable storage medium may include instructions to cause processing circuitry of a system for virtualizing power substation physical components including electrical assets and Intelligent Electronic Devices (IEDs) into a substation digital twin architecture, upon execution of the instructions by the processing circuitry, to: generate, for a first IED of a power substation, in a first virtual machine, a first IED digital twin that models historical and operational characteristics of the first IED; generate, based on forecasted weather and operational parameters of the power substation, adaptive or predictive settings for the first IED using the first IED digital twin; generate, based on physical sensor data measured or monitored by the first IED for the power substation, virtual sensors; generate, based on the virtual sensors, first virtual sensor data corresponding to electrical assets represented by the first IED; generating, in a second virtual machine, based on the first virtual sensor data, an asset digital twin model of the electrical assets; generate, based on the first virtual sensor data and the asset digital twin model, a cyber digital twin for the electrical assets; generate, based on the first virtual sensor data and the asset digital twin model, a physics-based digital twin for the electrical assets; generate a substation digital twin virtually representing the power substation, wherein the substation digital twin comprises a logical combination of cyber digital twins, comprising the cyber digital twin, and physics-based digital twins, comprising the physics-based digital twin, of electrical assets of IEDs, comprising the first IED, in the power substation; generate a substation digital twin architecture using a logical combination of substation digital twins comprising the substation digital twin; and manage a real-time power substation operation using the substation digital twin architecture and adaptive and predictive settings for the IEDs.

A system for virtualizing power substation physical components including electrical assets and Intelligence Electronic Devices (IEDs) into a substation digital twin architecture, may include: a power substation; and memory coupled to processing circuitry, wherein the processing circuitry is configured to: generate, for a first IED of a power substation, in a first virtual machine, a first IED digital twin that models historical and operational characteristics of the first IED; generate, based on forecasted weather and operational parameters of the power substation, adaptive or predictive settings for the first IED using the first IED digital twin; generate, based on physical sensor data measured or monitored by the first IED for the power substation, virtual sensors; generate, based on the virtual sensors, virtual sensor data corresponding to first electrical assets represented by the first IED; generate, in a second virtual machine, based on the first virtual sensor data, an asset digital twin model of the first electrical assets; generate, based on the virtual sensor data and the asset digital twin model, a cyber digital twin for the first electrical assets; generate, based on the virtual sensor data and the asset digital twin model, a physics-based digital twin for the first electrical assets; generate a substation digital twin virtually representing the power substation, wherein the substation digital twin comprises a logical combination of cyber digital twins, comprising the cyber digital twin, and physics-based digital twins, comprising the physics-based digital twin, of first electrical assets of IEDs, comprising the first IED, in the power substation; generate a substation digital twin architecture using a logical combination of substation digital twins comprising the substation digital twin; and manage a real-time power substation operation using the substation digital twin architecture and adaptive and predictive settings for the IEDs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
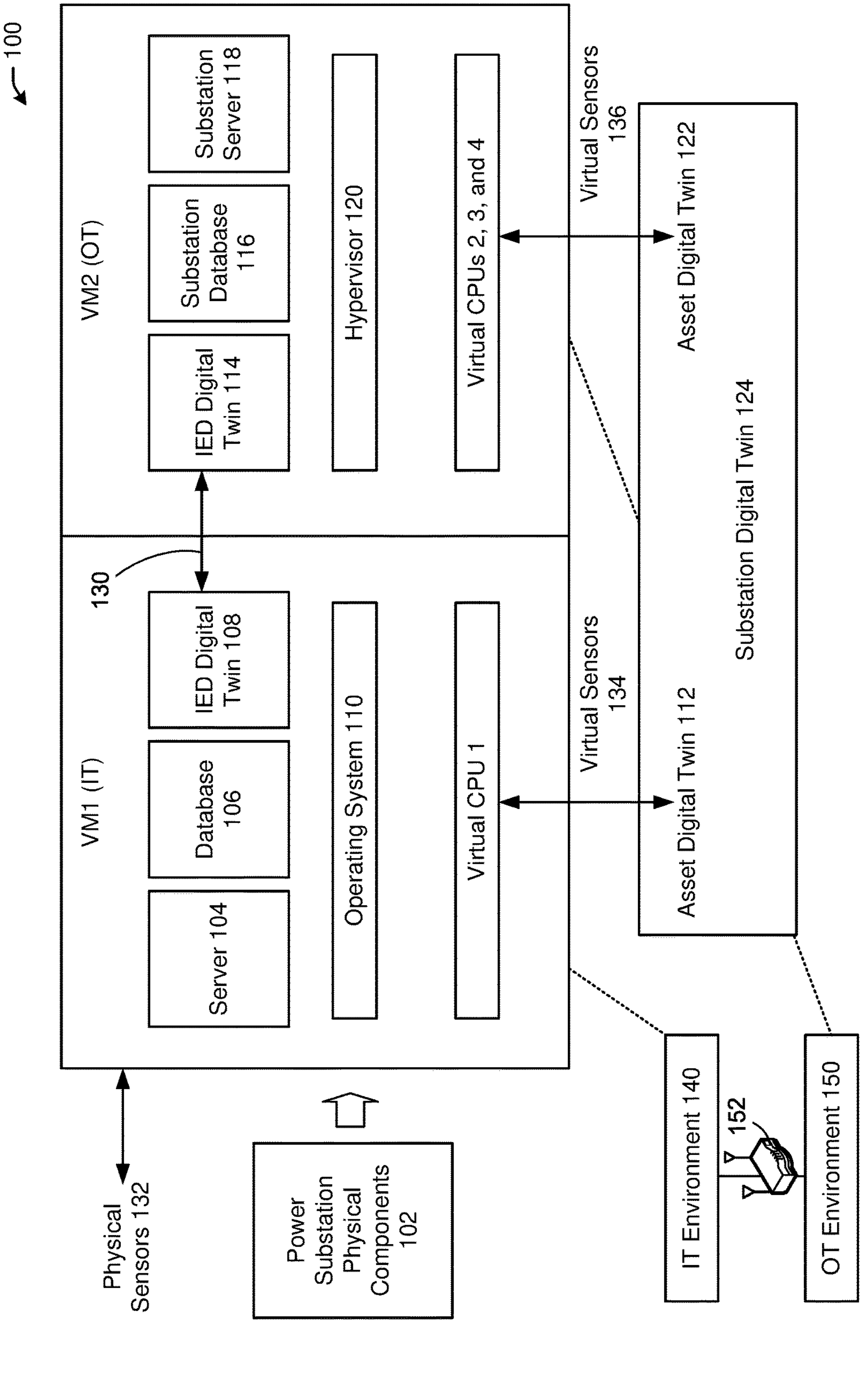
FIG. 1 is an example diagram representing virtualization of power substation physical components into an information technology-operational technology architecture with a shared memory in accordance with one embodiment of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Many critical infrastructure assets, such as power plants, transmission and distribution networks, transportation systems and water processing plants, are efficiently and safely operated using control systems. Such control systems act as the "brains" of the plant or asset reading information from sensors and sending command signals to actuators. Control systems are also critical subsystems in mobile assets such as aircraft, automobiles and even locomotives. However, these same critical control systems are now the focus of sophisticated cyber-attacks.

Digitalization of power grids may integrate operational technology (OT) with information technology (IT) infrastructures. For example, IT may represent substation gateways, engineering workstations, human machine interfaces (HMIs), supervisory control and data acquisition (SCADA) systems, databases, engineering servers, authentication servers, access control servers, and surveillance system servers. OT may represent a communication network (e.g., governed by the IEC 61850 standard) hardware, including protection devices, gateways, intelligent electronic devices (IEDs), control units, measurement and merging units, and other power grid devices. In many substations, there may be separate hardware for the above applications in IT and OT.

Virtualization allows for consolidating the IT and OT hardware. However, virtualization of substations for both IT and OT hardware may pose challenges, so the enhanced architecture herein may use digital twin modeling. Using virtualization with digital twin modeling in power substations may both reduce the hardware in the substation and improve reliability and security of substation operations (e.g., by monitoring both IT and OT data while maintaining separation of IT and OT environments).

Substation assets may be classified as primary assets and secondary assets. Primary assets may include transformers, switchgear, cyber-twin, physics-twin, and the like. Secondary assets may include IEDs and relays. In one or more embodiments, by modeling digital twins as primary and secondary assets individually, and by logically connecting the digital twins, a substation digital twin may be created. Virtualizing the primary and secondary assets of a power substation reduces hardware, and allows for scalability (e.g., additional substation assets) and improved monitoring and prediction of power substation performance.

In one or more embodiments, the enhanced digital twin architecture for substations herein may use virtual machines. Each virtual machine host virtual functions of the substation (e.g., critical and non-critical functions). IED data may be categorized into models for protection, metering, control, etc. inside a virtual machine database. Each data model may be created as a digital twin software model including common characteristics with all data models combined together to form a real-time IED digital twin. For each ID digital twin of a substation, a virtual equivalent may be created in a cloud/server to model historical characteristics, behavior, and/or configuration of the IED. Based on forecasted weather and operating parameters of a substation, adaptive and predictive settings may be derived using the virtual IED model (e.g., in the server/cloud) and pushed to a real-time model of the IED.

In one or more embodiments, from physical sensor data (e.g., process bus), virtual sensors may be created and mapped to measure data related to power substation assets. Virtual sensor data from each IED may be used to model asset digital twins in a separate virtual machine. Virtual sensor data may be used to model a virtual equivalent of each asset in the cloud/server. Each asset digital twin may include clones of cyber-physical and physics-based digital twins in the virtual machine based on the virtual sensor data. The cyber-physical digital twin may be modeled to ensure asset security, and the physics-based digital twin may be modeled to ensure asset reliability. In this manner, any asset of a power substation may be modeled by a cyber-physical digital twin and a physics-based digital twin. The asset digital twins may be combined to form a substation digital twin for improved situation awareness, planning, monitoring, and predictive operations of the substation.

In one or more embodiments, when a new substation asset is added, digital twins may be created for the new asset. In this manner, the digital twin enhancements herein are scalable. To create the digital twins for any substation asset, IED data may be uploaded to a server/cloud, which may learn from the IED data and set baselines. A replica (e.g., digital twin) of the IED may be created based on the baseline operation determined by the server/cloud, and cloned into a virtual machine as a model (e.g., deployed in a substation, server, or otherwise). The digital twin represented by the virtual machine may adaptively update the IED settings and predictively propose IED settings (e.g., based on current operation and forecasting, such as a maximum load for an asset and the like). The asset may be replicated as a cyber-based digital twin and a physics-based digital twin so that there are multiple types of digital twins for a given asset. The digital twins for an asset may be deployed as virtual machines. The cyber-based digital twin may be modeled to ensure asset security and availability. The physics-based digital twin may be modeled to ensure asset reliability and resiliency. The cyber-based digital twin and the physics-based digital twin may be combined to form a substation digital twin running in a group of virtual machine instances with specific resources allocated by a hypervisor.

In one or more embodiments, the cyber and physics-based digital twins may be generated based on asset design, operational characteristics, historical characteristics, learning insights from data, data-driven analytics, a finite element (FEA) analysis, a computer-aided design (CAD) model, and a failure mode and effects analysis (FMEA).

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is an example diagram 100 representing virtualization of power substation physical components into an information technology-operational technology architecture with a shared memory in accordance with one embodiment of the present disclosure.

Referring to FIG. 1, power substation physical components 102 (e.g., intelligent electronic devices, controllers, relays, etc.) may be modeled as virtual (e.g., software) devices at virtual machines (e.g., VM1 for IT infrastructure, and VM2 for OT infrastructure). The virtualization of the power substation physical components 102 may represent IT and OT for the power substation physical components 102. The VM1 for IT components may include a server 104 (e.g., a SCADA server), a database 106 (e.g., a SCADA database), NIDS-based IT analytics 108, an operating system 110, and a virtual CPU 1. VM1 may represent an asset digital twin 112 (e.g., an asset of the power substation physical components 102). The VM2 for the OT components may include detection system (DS)-based OT analytics 114, a substation database 116, a substation server 118, a hypervisor 120, and virtual CPUs 2, 3, and 4. VM2 may represent an asset digital twin 122 (e.g., an asset of the power substation physical components 102). In combination, the asset digital twins 112 and 122 may represent a substation digital twin 124 for a same asset. VM1 and VM2 may use an IPC/shared memory 130 to combine OT and IT data.

Still referring to FIG. 1, an IT environment 140 and an OT environment 150 may be separated by and communicate through a gateway 152 (or other device) with which to isolate the IT environment 140 from the OT environment 150. The IT environment 140 may represent substation gateways, engineering workstations, HMIs, SCADA systems, databases, engineering servers, authentication servers, access control servers, and surveillance system servers. The OT environment 150 may represent a communication network (e.g., governed by the IEC 61850 standard) hardware, including protection devices, gateways, intelligent electronic devices (IEDs), control units, measurement and merging units, and other power grid devices. VM1 may connect to the IT environment 140, and VM2 may connect to the OT environment 150. In this manner, the VMs each may be individually connected to the IT environment 140 or the OT environment 150 (e.g., using a network interface controller card).

In one or more embodiments, the hypervisor 120 may facilitate intra-VM communications for VM2. The IPC/shared memory 130 allows inter-VM communications between VM1 and VM2 so that the substation digital twin 160 may monitor both IT and OT data of the power substation physical components 102.

VM1 may receive physical sensor data from physical sensors 132 (e.g., process bus). Based on the physical sensor data, the substation digital twin 124 may create virtual sensors 134 and 136, and configure the virtual sensors 134 and 136 to map specific data related to substation assets managed by respective IED type (e.g., cyber, physical, asset, switchgear). Virtual sensor data from the virtual sensors 134 and 136 of each IED type may be used to create the asset digital twins 112 and 122 (e.g., the asset digital twin software models).

The asset digital twins 112 and 122 may be modeled/learned with historical characteristics, behavior, and configurations of their respective assets. Based on forecasted weather and operational parameters of a substation, adaptive and predictive thresholds and operational settings for each asset may be derived by using the asset digital twins 112 and 122, and pushed to real-time digital twin models of assets deployed in specific VM instances of an IED, which may monitor and manage asset loading and health.

Cross-correlation of IED metering data with asset digital twin data may be used to rule out cyber and/or physical issues with sensor/IED calibration. IED control data may be correlated with asset switchgear digital twin data to rule out breaker issues with trip circuit issues.

Each asset digital twin may have additional clones of cyber-based and physical-based digital twins in a same or different VM instance based on the virtual sensor data. A cyber (e.g., IT) digital twin may be modeled to ensure asset security and availability, and a physics (e.g., OT) digital twin may be modeled to ensure asset reliability and resiliency. The cyber and physical asset digital twins may be combined to form the substation digital twin 124 running in a group of VM instances with specific resources allocated from the hypervisor 120 to improve substation situational awareness, planning, and predictive operations.

Figure 2:
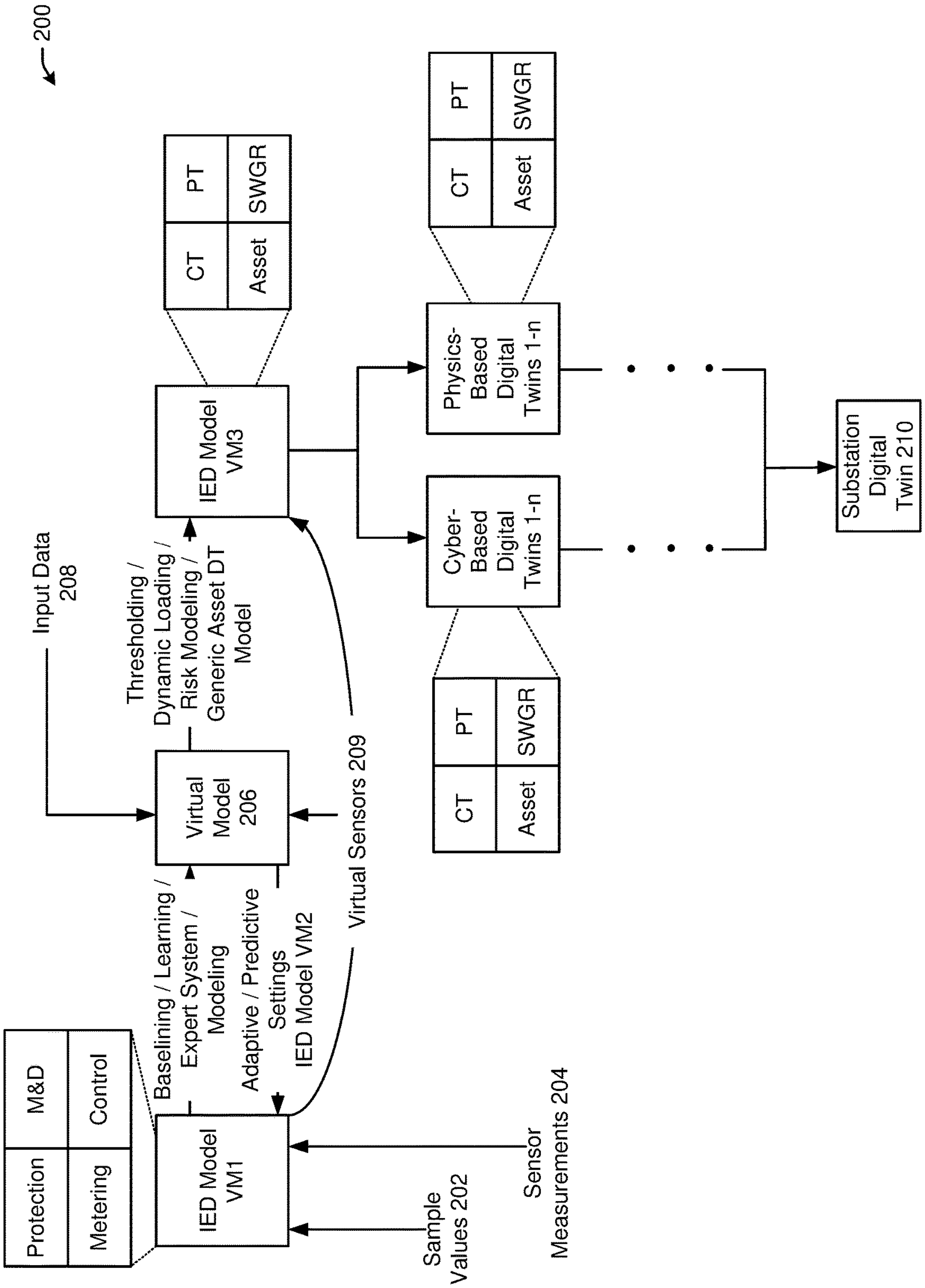
FIG. 2 is an example power substation digital twin architecture in accordance with one embodiment of the present disclosure.

FIG. 2 is an example power substation digital twin architecture 200 in accordance with one embodiment of the present disclosure.

Referring to FIG. 2, an IED model (e.g., VM1) may represent an IED of a power substation (e.g., the power substation physical components 102 of FIG. 1). VM1 may collect sample values 202 and sensor measurements 204 for the respective IED. The data from the sample values 202 and the sensor measurements 204 may be categorized as one of the following types: protection, monitoring and diagnostics (M&D), metering, and control. A virtual model 206 (e.g., in a cloud/server) may receive the data from the sample values 202 and the sensor measurements 204 from VM1, and may perform the learning, modeling, and baselining described above for the IED to generate an IED model VM2 for the IED. Continuous modeling of the data by the virtual model 206, based on input data 208 such as substation weather data, load data, forecast data, virtual sensor data, etc., may result in creation of an asset digital twin model (VM3).

VM3 may be based on thresholds, dynamic loading, asset risk modeling, and generic asset digital twin modeling. Based on forecasted weather and operational parameters of the substation, adaptive and predictive thresholds and operational settings for each asset managed by an IED may be derived using a virtual model of an asset digital twin and pushed to a real-time generic digital twin model of assets deployed in side a specific VM instance of an IED, which may monitor and manage asset loading and health, The IED may be for four types of primary assets (current transformer, potential transformer, switchgear, and the asset). Based on the sensor measurements 204 (e.g., physical sensor data), virtual sensors 209 may be generated, and virtual sensor data from the virtual sensors 209 may model data limited to the primary asset, and may be classified as current transformer data, potential transformer data, switchgear data, and asset data. VM3 may be created based on the virtual sensor data. For example, virtual sensor data of each type (e.g., CT, PT, asset, switchgear (SWGR)) may be used to create an asset digital twin to form a real-time generic asset digital twin.

Once the digital twin of a primary asset has been created, the digital twin may be cloned and deployed (e.g., VM2). In this manner, the virtual model 206 may adaptively update the settings of the IED (e.g., VM2) based on current IED operations, and predict settings of the IED for a subsequent cycle. The asset digital twins (e.g., the cyber-based and physics-based digital twins) may propose thresholds of the health of the respective asset, the dynamic loading (e.g., maximum load) of the respective asset, and the performance risk of the asset (e.g., predicted performance degradation in terms of efficiency).

Still referring to FIG. 2, VM3 as a primary asset digital twin may be modeled as cyber-based digital twins 1-*n* (e.g., IT VMs) and as physics-based digital twins 1-*n* (e.g., OT VMs) for n assets. The physics-based digital twins model physics of the asset operation. The cyber-based digital twins identify deviations in the physics-based operation of the asset (e.g., based on current operation of the asset). A substation digital twin 210 may be created by logical connections of the primary and secondary asset digital twins. The substation digital twin 210 is scalable to allow for the addition of new assets modeled by digital twins.

Figure 3:
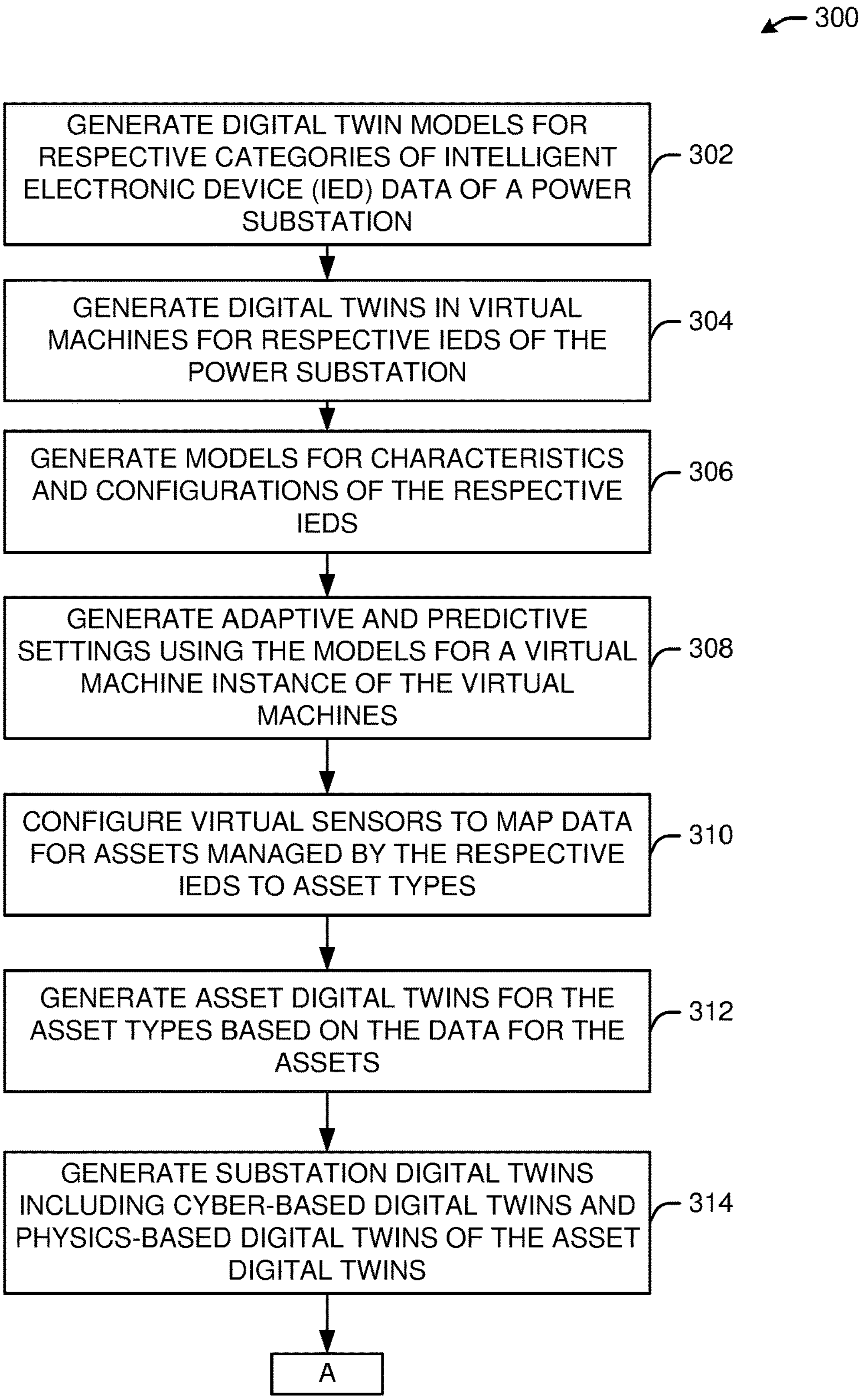
FIG. 3 is a flow for a process for generating digital twins for power substation assets in accordance with one embodiment of the present disclosure.

FIG. 3 is a flow for a process 300 for generating digital twins for power substation assets in accordance with one embodiment of the present disclosure.

At block 302, a device (or system, e.g., the diagram 100 of FIG. 1, the architecture 200 of FIG. 2, the virtualized system devices 509 of FIG. 5) may generate digital twin models for respective categories of IED data of a power substation (e.g., for the power substation physical components 102 of FIG. 1). The categories of IED data may include protection, M&D, metering, and control. The sample values 202 and sensor measurements 204 of FIG. 2, may be categorized as the categories of IED data.

At block 304, the device may generate digital twins in VMs for respective IEDs of the power substation. For a given substation IED, a digital twin may be created using a first virtual machine connected to an IT environment and a second virtual machine connected to an OT environment, and the virtual machines for the IED may be connected via a shared memory to allow access to both IT and OT data. A digital twin may be generated for a current transformer, and predicted transformer, an asset, or a switchgear.

At block 306, the device may generate models for characteristics and configurations for the respective IEDs by using the digital twins, which may model historical characteristics, behavior, and configurations of the respective IED.

At block 308, the device may generate adaptive and predictive settings using the models of block 306 to be pushed to a virtual machine instance of the respective virtual machines for the digital twins. The models may use forecasted weather and operational parameters of the power substation to adaptively predict settings of the IED. The settings may include thresholds of the health of the respective asset, the dynamic loading (e.g., maximum load) of the respective asset, and the performance risk of the asset (e.g., predicted performance degradation in terms of efficiency). The settings may be adaptive based on data from the substation and forecasted weather conditions. For example, the digital twins of a respective asset may use the forecasted weather and operational parameters to determine the settings.

At block 310, the device may configure virtual sensors to map data for assets managed by the respective IEDs to asset types. The asset types may include current transformer, potential transformer, switchgear, and the asset. At block 312, the device may generate digital asset twins for the asset types based on the data for the assets. The virtual sensor data may model data limited to a primary asset, and may be classified as current transformer data, potential transformer data, switchgear data, and asset data. The digital twins may be created based on the virtual sensor data.

At block 314, the device may generate substation digital twins including cyber-based digital twins (e.g., for IT) and physics-based digital twins (e.g., for OT) of the asset digital twins. In this manner, for any power substation, any asset of the substation may be modeled as a pair of digital twins, and the substation itself may include the digital twins of the respective assets of the substation. The process 300 may continue to block A.

Figure 4:
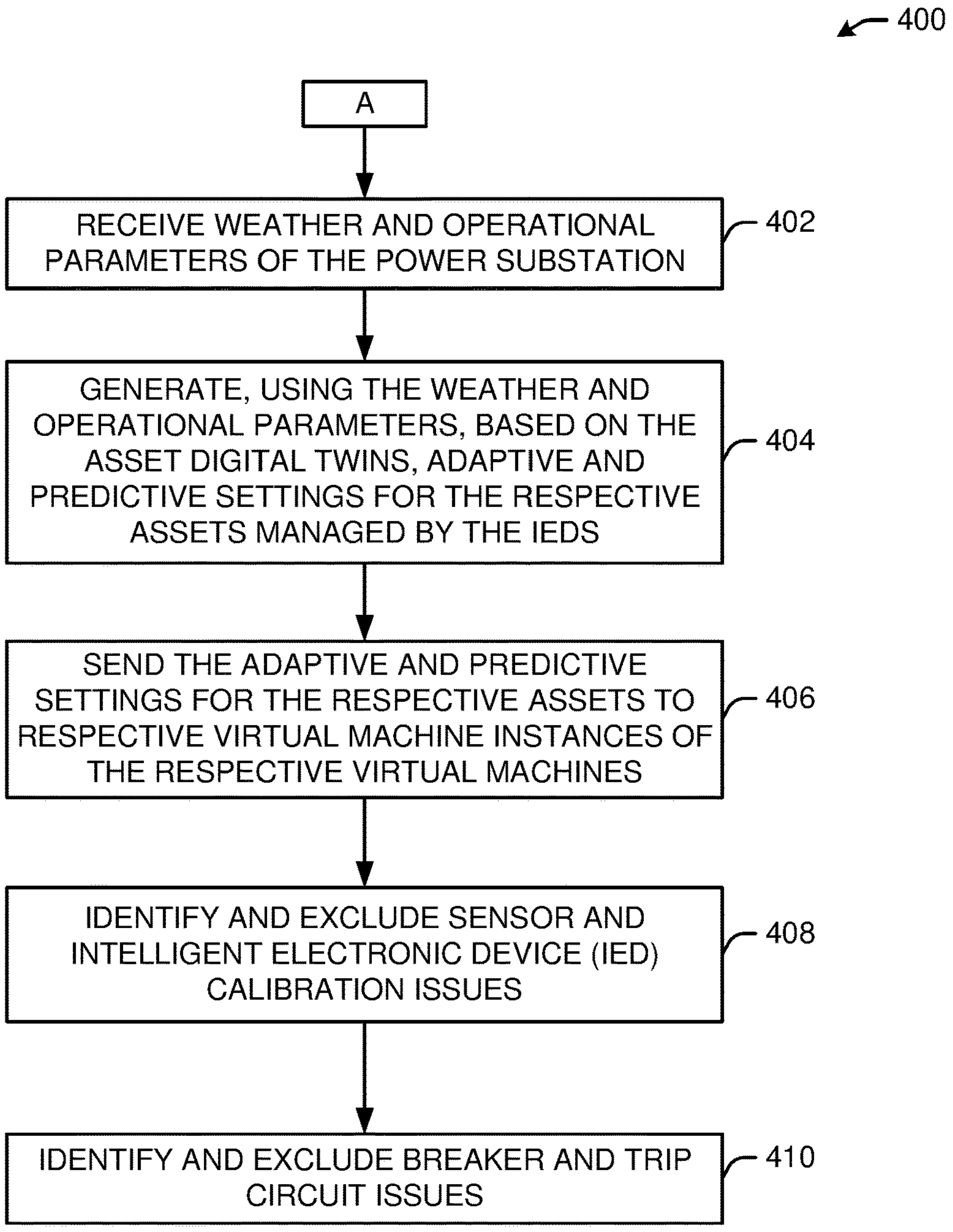
FIG. 4 is a flow for a process for monitoring and predicting power substation performance using the digital twins of FIG. 3 in accordance with one embodiment of the present disclosure.

FIG. 4 is a flow for a process 400 for monitoring and predicting power substation performance using the digital twins of FIG. 3 in accordance with one embodiment of the present disclosure.

At block 402, a device (or system, e.g., the diagram 100 of FIG. 1, the architecture 200 of FIG. 2, the virtualized system devices 509 of FIG. 5) may, beginning from block A of FIG. 3, receive weather and operational parameters of the power substation modeled as the substation digital twins in FIG. 3.

At block 404, the device may generate, using the weather and operational parameters of the power substation, based on the digital asset twins, adaptive and predictive settings for the respective assets managed by the IEDs. For example, the digital twins for a respective asset may use the weather and operational parameters to determine the settings. The models used by the digital twins may use forecasted weather and operational parameters of the power substation to adaptively predict settings of the IED. The settings may include thresholds of the health of the respective asset, the dynamic loading (e.g., maximum load) of the respective asset, and the performance risk of the asset (e.g., predicted performance degradation in terms of efficiency). The settings may be adaptive based on data from the substation and forecasted weather conditions.

At block 406, the device may send the adaptive and predictive settings for the respective assets to respective VM instances of the respective VMs (e.g., to update the models). At block 408, the device may identify and exclude sensor and IED calibration issues. At block 410, the device may identify and exclude breaker and trip circuit issues. As a result, the monitoring and prediction of the substation by using the virtual twins is improved (e.g., improved accuracy and cyber security) by cross-correlation of IED metering data (e.g., power substation metering data) with current transformer/power transformer digital twin data, and of IED control data (e.g., power substation control data) with asset switchgear digital twin data.

It is understood that the above descriptions are for purposes of illustration and are not meant to be limiting.

Figure 5:
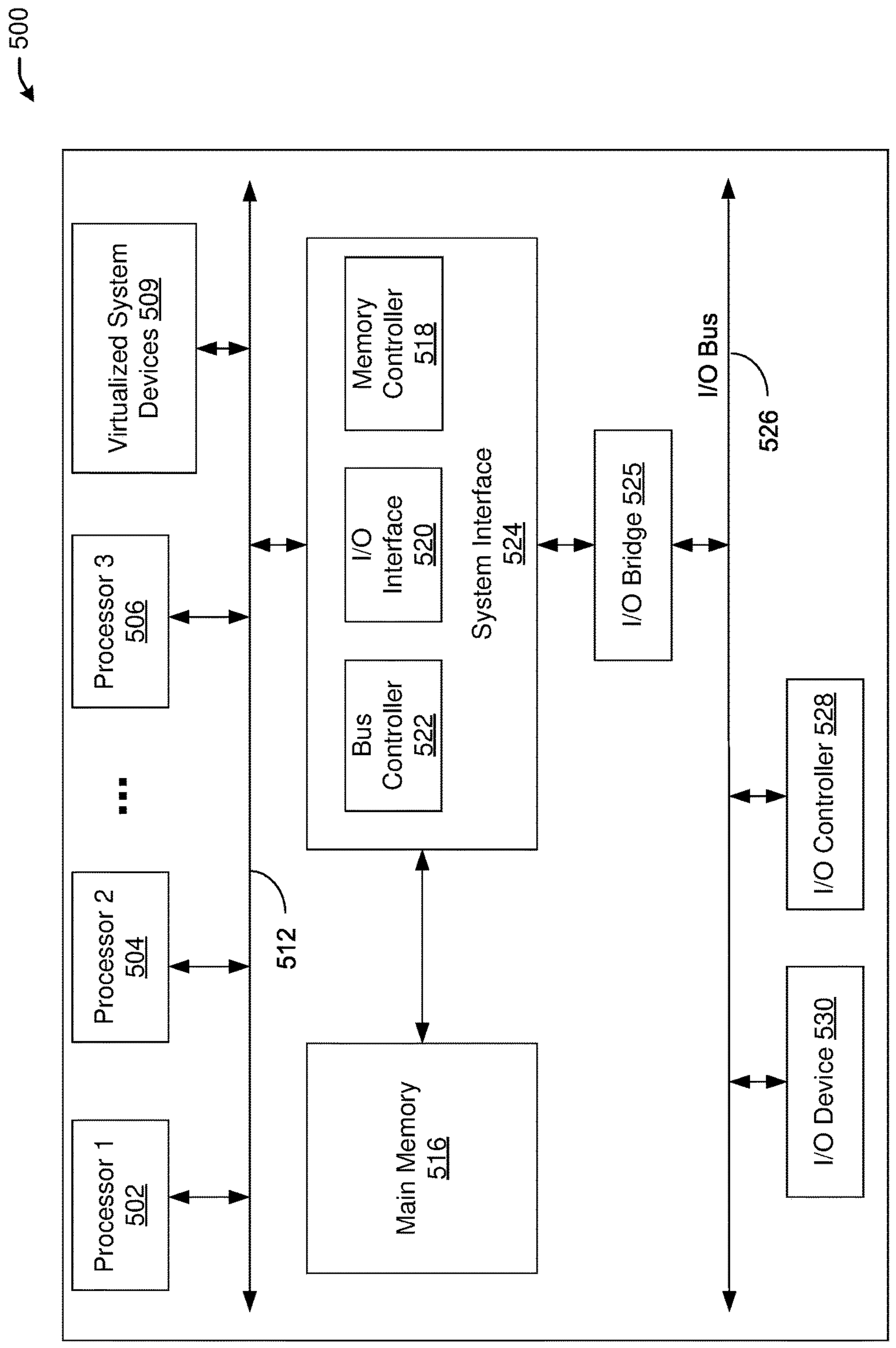
FIG. 5 is a diagram illustrating an example of a computing system that may be used in implementing embodiments of the present disclosure.

FIG. 5 is a diagram illustrating an example of a computing system 500 that may be used in implementing embodiments of the present disclosure.

The computer system 500 (system) includes one or more processors 502-506 and virtualized system devices 509 (e.g., representing at least a portion of the diagram 100 of FIG. 1, the architecture 200 of FIG. 2). Processors 502-506 may include one or more internal levels of cache (not shown) and a bus controller 522 or bus interface unit to direct interaction with the processor bus 512. Processor bus 512, also known as the host bus or the front side bus, may be used to couple the processors 502-506 with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for virtualizing power substation physical components including electrical assets and Intelligent Electronic Devices (IEDs) into a substation digital twin architecture, the method comprising:

generating, for a first IED of a power substation, in a first virtual machine, a first IED digital twin that models historical and operational characteristics of the first IED;

generating, based on forecasted weather and operational parameters of the power substation, adaptive or predictive settings for the first IED using the first IED digital twin;

generating, based on physical sensor data measured or monitored by the first IED for the power substation, virtual sensors;

generating, based on the virtual sensors, first virtual sensor data corresponding to first electrical assets represented by the first IED;

generating, in a second virtual machine, based on the first virtual sensor data, an asset digital twin model of the first electrical assets;

generating, based on the first virtual sensor data and the asset digital twin model, a cyber digital twin for the first electrical assets;

generating, based on the first virtual sensor data and the asset digital twin model, a physics-based digital twin for the first electrical assets;

generating a substation digital twin virtually representing the power substation, wherein the substation digital twin comprises a logical combination of cyber digital twins, comprising the cyber digital twin, and physics-based digital twins, comprising the physics-based digital twin, of electrical assets of IEDs, comprising the first IED, in the power substation;

generating a substation digital twin architecture using a logical combination of substation digital twins comprising the substation digital twin; and managing a real-time power substation operation using the substation digital twin architecture and adaptive and predictive settings for the IEDs.

2. The method of claim 1, further comprising:

generating, for second electrical assets of the second IED of the power substation, in a second virtual machine, a second IED digital twin that models historical and operational characteristics of the second IED;

generating, based on the forecasted weather and the operational parameters of the power substation, second adaptive or predictive settings for the second IED using the second IED digital twin;

generating, based on physical sensor data measured or monitored by the second IED for the power substation, second virtual sensors; generating, in a third virtual machine, based on second virtual sensor data from the second virtual sensors, a second asset digital twin model of second electrical assets monitored, protected, and controlled by or represented by the second IED;

generating, based on the second virtual sensor data and the second asset digital twin model, a second cyber digital twin for the second electrical assets; and generating, based on the second virtual sensor data and the second asset digital twin model, a second physics-based digital twin for the second electrical assets; and wherein the substation digital twin further comprises the second cyber digital twin and the second physics-based digital twin.

3. The method of claim 1, wherein the adaptive or the predictive settings comprise at least one of thresholds, a maximum load, or a predicted performance or health degradation for at least one of the electrical assets and operational settings for protection, control and automation algorithms in the first IED.

4. The method of claim 1, further comprising:

mapping, using the first virtual sensor data, data for the first IED to at least one of a current or voltage transformer, a power transformer, a substation asset, or a switchgear.

5. The method of claim 4, wherein the generating of the cyber digital twin and the generating of the physics-based digital twin are based on the mapping, asset design, the operational characteristics, the historical characteristics, learning insights from the data, data-driven analytics, a finite element (FEA) analysis, a computer-aided design (CAD) model, and a failure mode and effects analysis (FMEA).

6. The method of claim 1, further comprising:

detecting sensor issues or calibration issues by identifying, using the substation digital twin, a correlation between metering data of the power substation and at least one of current transformer digital twin data or predicted current transformer digital twin data.

7. The method of claim 1, further comprising:

detecting trip circuit issues by identifying, using the substation digital twin, a correlation between control data of the power substation and switchgear digital twin data.

8. A non-transitory computer-readable storage medium comprising instructions to cause processing circuitry of a system for virtualizing power substation physical components including electrical assets and Intelligent Electronic Devices (IEDs) into a substation digital twin architecture, upon execution of the instructions by the processing circuitry, to:

generate, for a first IED of a power substation, in a first virtual machine, a first IED digital twin that models historical and operational characteristics of the first IED;

generate, based on forecasted weather and operational parameters of the power substation, adaptive or predictive settings for the first IED using the first IED digital twin;

generate, based on physical sensor data measured or monitored by the first IED for the power substation, virtual sensors;

generate, based on the virtual sensors, first virtual sensor data corresponding to electrical assets represented by the first IED;

generating, in a second virtual machine, based on the first virtual sensor data, an asset digital twin model of the electrical assets;

generate, based on the first virtual sensor data and the asset digital twin model, a cyber digital twin for the electrical assets;

generate, based on the first virtual sensor data and the asset digital twin model, a physics-based digital twin for the electrical assets;

generate a substation digital twin virtually representing the power substation, wherein the substation digital twin comprises a logical combination of cyber digital twins, comprising the cyber digital twin, and physics-based digital twins, comprising the physics-based digital twin, of electrical assets of IEDs, comprising the first IED, in the power substation;

generate a substation digital twin architecture using a logical combination of substation digital twins comprising the substation digital twin; and manage a real-time power substation operation using the substation digital twin architecture and adaptive and predictive settings for the IEDs.

9. The non-transitory computer-readable storage medium of claim 8, wherein execution of the instructions further causes the processing circuitry to:

generate, for second electrical assets of a second IED of the power substation, in the second virtual machine, a second IED digital twin that models historical and operational characteristics of the second IED;

generate, based on the forecasted weather and the operational parameters of the power substation, second adaptive or predictive settings for the second IED using the second IED digital twin;

generate, based on physical sensor data measured or monitored by the second IED for the power substation, second virtual sensors; generate, in a third virtual machine, based on second virtual sensor data from the second virtual sensors, a second asset digital twin model of second electrical assets monitored, protected, and controlled by or represented by the second IED;

generate, based on the second virtual sensor data and the second asset digital twin model, a second cyber digital twin for the second electrical assets; and generate, based on the second virtual sensor data and the second asset digital twin model, a second physics-based digital twin for the second electrical assets; and wherein the substation digital twin further comprises the second cyber digital twin and the second physics-based digital twin.

10. The non-transitory computer-readable storage medium of claim 8, wherein the adaptive or the predictive settings comprise at least one of thresholds, a maximum load, or a predicted performance or health degradation for at least one of the electrical assets and operational settings for protection, control and automation algorithms in the first IED.

11. The non-transitory computer-readable storage medium of claim 8, wherein execution of the instructions further causes the processing circuitry to:

map, using the first virtual sensor data, data for the first IED to at least one of a current or voltage transformer, a power transformer, a substation asset, or a switchgear.

12. The non-transitory computer-readable storage medium of claim 11, wherein to generate the cyber digital twin and to generate the physics-based digital twin are based on the mapping, asset design, the operational characteristics, the historical characteristics, learning insights from the data, data-driven analytics, a finite element (FEA) analysis, a computer-aided design (CAD) model, and a failure mode and effects analysis (FMEA).

13. The non-transitory computer-readable storage medium of claim 8, wherein execution of the instructions further causes the processing circuitry to:

detect sensor issues or calibration issues by identifying, using the substation digital twin, a correlation between metering data of the power substation and at least one of current transformer digital twin data or predicted current transformer digital twin data.

14. The non-transitory computer-readable storage medium of claim 8, wherein execution of the instructions further causes the processing circuitry to:

detect trip circuit issues by identifying, using the substation digital twin, a correlation between control data of the power substation and switchgear digital twin data.

15. A system for virtualizing power substation physical components including electrical assets and Intelligence Electronic Devices (IEDs) into a substation digital twin architecture, the system comprising:

a power substation; and a memory coupled to processing circuitry, wherein the processing circuitry is configured to:

generate, for a first IED of a power substation, in a first virtual machine, a first IED digital twin that models historical and operational characteristics of the first IED;

generate, based on forecasted weather and operational parameters of the power substation, adaptive or predictive settings for the first IED using the first IED digital twin; generate, based on physical sensor data measured or monitored by the first IED for the power substation, virtual sensors;

generate, based on the virtual sensors, first virtual sensor data corresponding to first electrical assets represented by the first IED;

generate, in a second virtual machine, based on the first virtual sensor data, an asset digital twin model of the first electrical assets;

generate, based on the first virtual sensor data and the asset digital twin model, a cyber digital twin for the first electrical assets; generate, based on the first virtual sensor data and the asset digital twin model, a physics-based digital twin for the first electrical assets;

generate a substation digital twin virtually representing the power substation, wherein the substation digital twin comprises a logical combination of cyber digital twins, comprising the cyber digital twin, and physics-based digital twins, comprising the physics-based digital twin, of first electrical assets of IEDs, comprising the first IED, in the power substation;

generate a substation digital twin architecture using a logical combination of substation digital twins comprising the substation digital twin; and manage a real-time power substation operation using the substation digital twin architecture and adaptive and predictive settings for the IEDs.

16. The system of claim 15, wherein the processing circuitry is further configured to:

generate, for second electrical assets of a second IED of the power substation, in the second virtual machine, a second IED digital twin that models historical and operational characteristics of the second IED;

generate, based on the forecasted weather and the operational parameters of the power substation, second adaptive or predictive settings for the second IED using the second IED digital twin;

generate, based on physical sensor data monitored by the second IED for the power substation, second virtual sensors;

generate, in a third virtual machine, based on second virtual sensor data from the second virtual sensors, a second asset digital twin model of second electrical assets monitored, protected, and controlled by or represented by the second IED;

generate, based on the second virtual sensor data and the second asset digital twin model, a second cyber digital twin for the second electrical assets; and generate, based on the second virtual sensor data and the second asset digital twin model, a second physics-based digital twin for the second electrical assets; and wherein the substation digital twin further comprises the second cyber digital twin and the second physics-based digital twin.

17. The system of claim 15, wherein the adaptive or the predictive settings comprise at least one of thresholds, a maximum load, or a predicted performance or health degradation for at least one of the electrical assets and operational settings for protection, control and automation algorithms in the first IED.

18. The system of claim 15, wherein the processing circuitry is further configured to:

map, using the first virtual sensor data, data for the first IED to at least one of a current or voltage transformer, a power transformer, a substation asset, or a switchgear.

19. The system of claim 15, wherein the processing circuitry is further configured to:

detect sensor issues or calibration issues by identifying, using the substation digital twin, a correlation between metering data of the power substation and at least one of current transformer digital twin data or predicted current transformer digital twin data.

20. The system of claim 15, wherein the processing circuitry is further configured to:

detect trip circuit issues by identifying, using the substation digital twin, a correlation between control data of the power substation and switchgear digital twin data.

* * * * *